US010590593B1

(12) United States Patent
Leibman et al.

(10) Patent No.: US 10,590,593 B1
(45) Date of Patent: Mar. 17, 2020

(54) LINT CLEANING ASSEMBLY FOR A DRYER APPLIANCE

(71) Applicant: Haier US Appliance Solutions, Inc., Wilmington, DE (US)

(72) Inventors: Alexander B. Leibman, Prospect, KY (US); Manidhar V V S Yandamuri, Hyderabad (IN); Michael Glenn Mattingly, Louisville, KY (US); Wayne E. Lawson, La Grange, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 16/149,207

(22) Filed: Oct. 2, 2018

(51) Int. Cl.
*D06F 58/22* (2006.01)
*G05D 1/02* (2006.01)
*A47L 7/00* (2006.01)

(52) U.S. Cl.
CPC .............. *D06F 58/22* (2013.01); *A47L 7/009* (2013.01); *G05D 1/0225* (2013.01); *A47L 2201/022* (2013.01); *G05D 2201/0215* (2013.01)

(58) Field of Classification Search
CPC .......... D06F 58/22; D06F 58/26; D06F 58/28; A47L 7/009; A47L 2201/22; G05D 1/0225; G05D 2201/22
USPC .......................................................... 34/82
See application file for complete search history.

(56) References Cited

U.S. PATENT DOCUMENTS

| 2,742,708 | A |   | 4/1956  | McCormic |
|---|---|---|---|---|
| 2,780,009 | A |   | 2/1957  | Stickel |
| 3,001,295 | A |   | 9/1961  | Miller |
| 3,069,785 | A |   | 12/1962 | Mitter et al. |
| 3,081,554 | A |   | 3/1963  | Long |
| 3,132,006 | A |   | 5/1964  | Brucken |
| 3,220,230 | A |   | 11/1965 | Jacobs et al. |
| 3,263,343 | A |   | 8/1966  | Loos |
| 4,314,409 | A | * | 2/1982  | Cartier ................... D06F 58/22 34/604 |
| 4,621,438 | A |   | 11/1986 | Thompson |
| 4,700,492 | A | * | 10/1987 | Werner ................... D06F 58/22 34/403 |
| 5,904,160 | A |   | 5/1999  | Wright |
| 6,016,610 | A | * | 1/2000  | Sears ...................... D06F 58/22 34/604 |
| 6,481,047 | B1 * | | 11/2002 | Schaefer .................. A47L 7/00 15/314 |

(Continued)

FOREIGN PATENT DOCUMENTS

| DE | 102008055086 | A1 * | 6/2010  | ............. D06F 58/22 |
|---|---|---|---|---|
| EP | 1719833 | A1 * | 11/2006 | ............. D06F 58/22 |

(Continued)

*Primary Examiner* — Stephen M Gravini
(74) *Attorney, Agent, or Firm* — Dority & Manning, P.A.

(57) ABSTRACT

A lint cleaning assembly for a dryer appliance includes a vacuum aperture defined in a cabinet of the dryer appliance to allow a robotic vacuum cleaner to drive into the cabinet. A lint filter collects lint within a trap duct during operation and a lint collection duct extends from the trap duct to a vacuum docking station. The vacuum docking station is positioned within the cabinet for docking the robotic vacuum cleaner, fluidly coupling the robotic vacuum cleaner to the lint collection duct for lint removal, and/or charging the batteries of the robotic vacuum cleaner.

20 Claims, 6 Drawing Sheets

(56) References Cited

U.S. PATENT DOCUMENTS

| | | |
|---|---|---|
| 6,671,977 B2 | 1/2004 | Beaumont |
| 7,047,664 B1 * | 5/2006 | Martinez ................. D06F 58/20 |
| | | 34/380 |
| 7,257,905 B2 | 8/2007 | Guinibert et al. |
| 7,325,332 B2 * | 2/2008 | Chung .................... D06F 58/22 |
| | | 34/602 |
| 7,658,804 B1 * | 2/2010 | Cano ..................... B08B 9/0436 |
| | | 134/8 |
| 7,921,578 B2 | 4/2011 | McAllister et al. |
| 8,001,650 B2 * | 8/2011 | Trotter ...................... A47L 5/38 |
| | | 15/314 |
| 8,201,345 B2 * | 6/2012 | Dalton ................... D06F 58/28 |
| | | 34/389 |
| 8,667,705 B2 * | 3/2014 | Shin ........................ D06F 58/22 |
| | | 34/595 |
| 8,713,813 B2 * | 5/2014 | Sans Rovira ........... D06F 58/22 |
| | | 134/42 |
| 8,869,421 B2 * | 10/2014 | Kim ........................ D06F 25/00 |
| | | 34/381 |
| 9,382,658 B2 * | 7/2016 | Tarifi ..................... D06F 58/20 |
| 9,783,925 B1 * | 10/2017 | Pollett .................... D06F 58/28 |
| 9,851,711 B2 | 12/2017 | Yoo et al. |
| 9,885,143 B2 * | 2/2018 | Grunert .................. D06F 58/22 |
| 9,920,469 B2 | 3/2018 | Ramprasad et al. |
| 10,100,459 B2 * | 10/2018 | Groppel .................. D06F 58/20 |
| 10,145,057 B2 * | 12/2018 | Goble ....................... A47L 9/00 |
| 10,280,552 B2 * | 5/2019 | Kulkarni ................ D06F 58/22 |
| 10,301,764 B2 * | 5/2019 | Woodham, Jr. ......... D06F 58/22 |
| 2004/0221474 A1 | 11/2004 | Slutsky |
| 2006/0096335 A1 | 5/2006 | Park et al. |
| 2007/0095027 A1 | 5/2007 | Liva |
| 2007/0144028 A1 | 6/2007 | Audet et al. |
| 2012/0005913 A1 * | 1/2012 | McKinley ............... D06F 58/22 |
| | | 34/82 |
| 2012/0096739 A1 | 4/2012 | Clark |
| 2018/0030645 A1 | 2/2018 | Kulkarni |
| 2019/0246783 A1 * | 8/2019 | Allen-Gipson ......... D06F 58/22 |
| 2019/0345662 A1 * | 11/2019 | Hato ....................... D06F 58/22 |

FOREIGN PATENT DOCUMENTS

| | | | | |
|---|---|---|---|---|
| EP | 2202349 A2 | * | 6/2010 | ............. D06F 58/22 |
| EP | 3066254 B1 | * | 12/2018 | ............. D06F 58/22 |
| EP | 3418005 A1 | * | 12/2018 | ............. A47L 9/28 |
| JP | 2003275497 A | | 9/2003 | |
| JP | 2006255423 A | * | 9/2006 | ............. D06F 58/22 |
| JP | 2019000634 A | * | 1/2019 | ......... A47L 11/4011 |
| WO | WO2010028992 A1 | | 3/2010 | |

\* cited by examiner

LINT CLEANING ASSEMBLY FOR A DRYER APPLIANCE

FIELD OF THE INVENTION

The present subject matter relates generally to dryer appliances, and more particularly to systems and methods for removing lint from a lint filter of a dryer appliance.

BACKGROUND OF THE INVENTION

Dryer appliances generally include a cabinet with a drum rotatably mounted therein. During operation, a motor rotates the drum, e.g., to tumble articles located within a chamber defined by the drum. Dryer appliances also generally include a heater assembly that passes heated air through the chamber in order to dry moisture-laden articles positioned therein. Typically, an air handler or blower is used to urge the flow of heated air from chamber, through a trap duct, and to the exhaust duct where it is exhausted from the dryer appliance. Dryer appliances may further include filter systems for removing foreign materials, such as lint, from passing into the exhaust conduit.

Notably, failure to frequently remove lint that collects in the lint filter may result in impaired dryer performance and may present a fire hazard due to the potential for combustion. Thus, a user of a conventional dryer appliance must typically remove the lint filter prior to each use and manually clear the collected lint from the filter. However, users commonly forget to remove lint prior to each use or otherwise find the process tedious. Certain conventional dryer appliances have systems for automatically removing lint from lint filters, but such system are frequently complex, costly, and largely ineffective at removing lint from the filter.

Accordingly, a dryer appliance and associated methods of operation that facilitate improved lint removal would be desirable. More specifically, a dryer appliance that can receive a lint cleaning vacuum to periodically and automatically clean lint from the lint filter would be particularly beneficial.

BRIEF DESCRIPTION OF THE INVENTION

Aspects and advantages of the invention will be set forth in part in the following description, or may be obvious from the description, or may be learned through practice of the invention.

In one aspect of the present disclosure, a dryer appliance defining a vertical, a lateral, and a transverse direction is provided. The dryer appliance includes a cabinet defining a vacuum aperture configured for receiving a robotic vacuum cleaner. A drum is rotatably mounted within the cabinet, the drum defining a chamber for receipt of clothes for drying. An air handler is provided for urging a flow of air through the chamber and a trap duct is in fluid communication with the chamber and includes a lint filter for filtering lint from the flow of air exiting the chamber. A vacuum docking station is positioned within the cabinet for receiving the robotic vacuum cleaner and a lint collection duct provides fluid communication between the trap duct and the vacuum docking station to permit the robotic vacuum cleaner to remove lint from the lint filter.

In another aspect of the present disclosure, a lint cleaning assembly for a dryer appliance is provided. The dryer appliance includes a cabinet defining a vacuum aperture for receiving a robotic vacuum cleaner and a drum defining a chamber for receiving clothes for drying. The lint cleaning assembly includes a trap duct in fluid communication with the chamber and including a lint filter for filtering lint from a flow of air exiting the chamber. A vacuum docking station is positioned within the cabinet for receiving the robotic vacuum cleaner and a lint collection duct provides fluid communication between the trap duct and the vacuum docking station to permit the robotic vacuum cleaner to remove lint from the lint filter.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
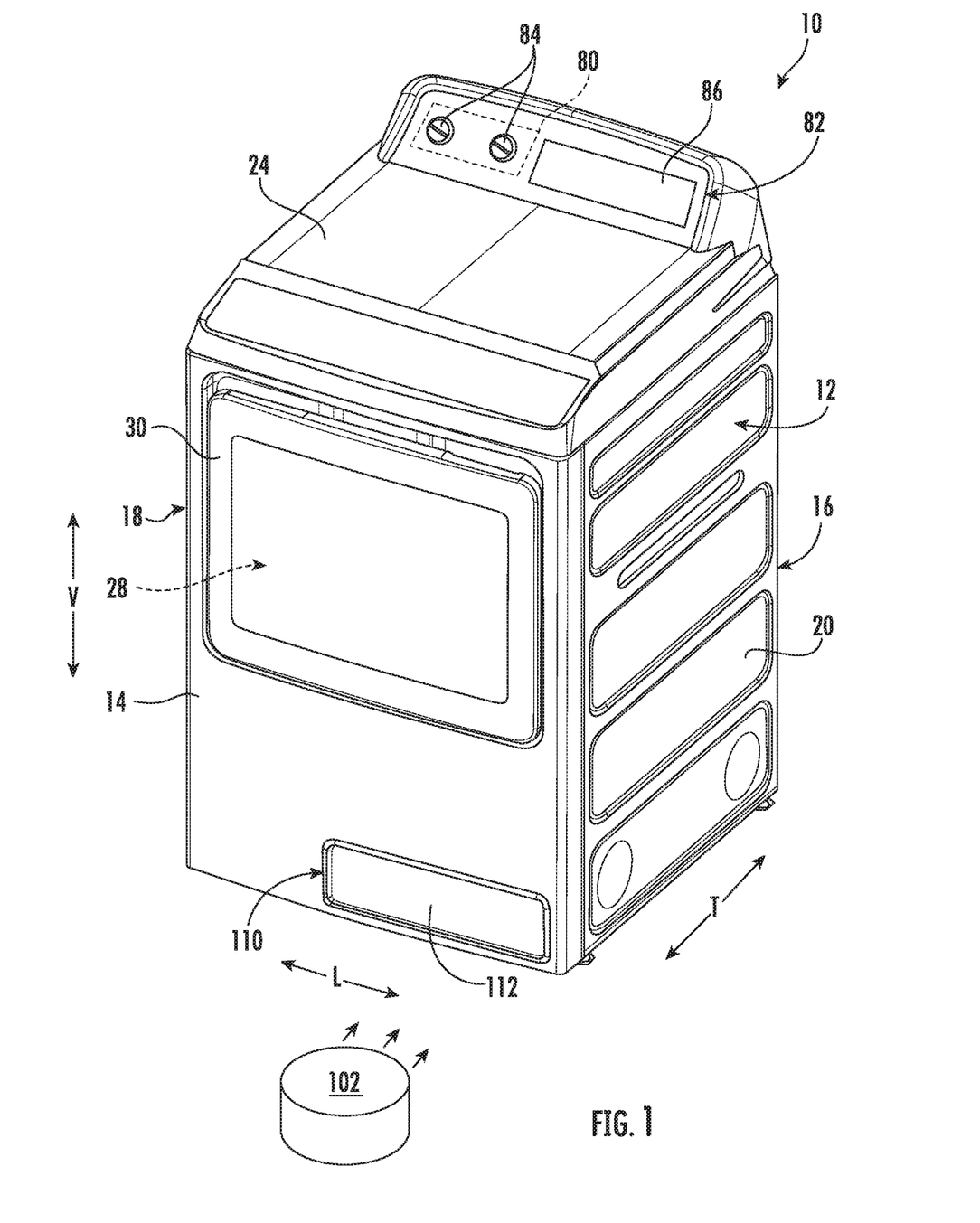
FIG. 1 provides a perspective view of a dryer appliance according to exemplary embodiments of the present disclosure.
Figure 2:
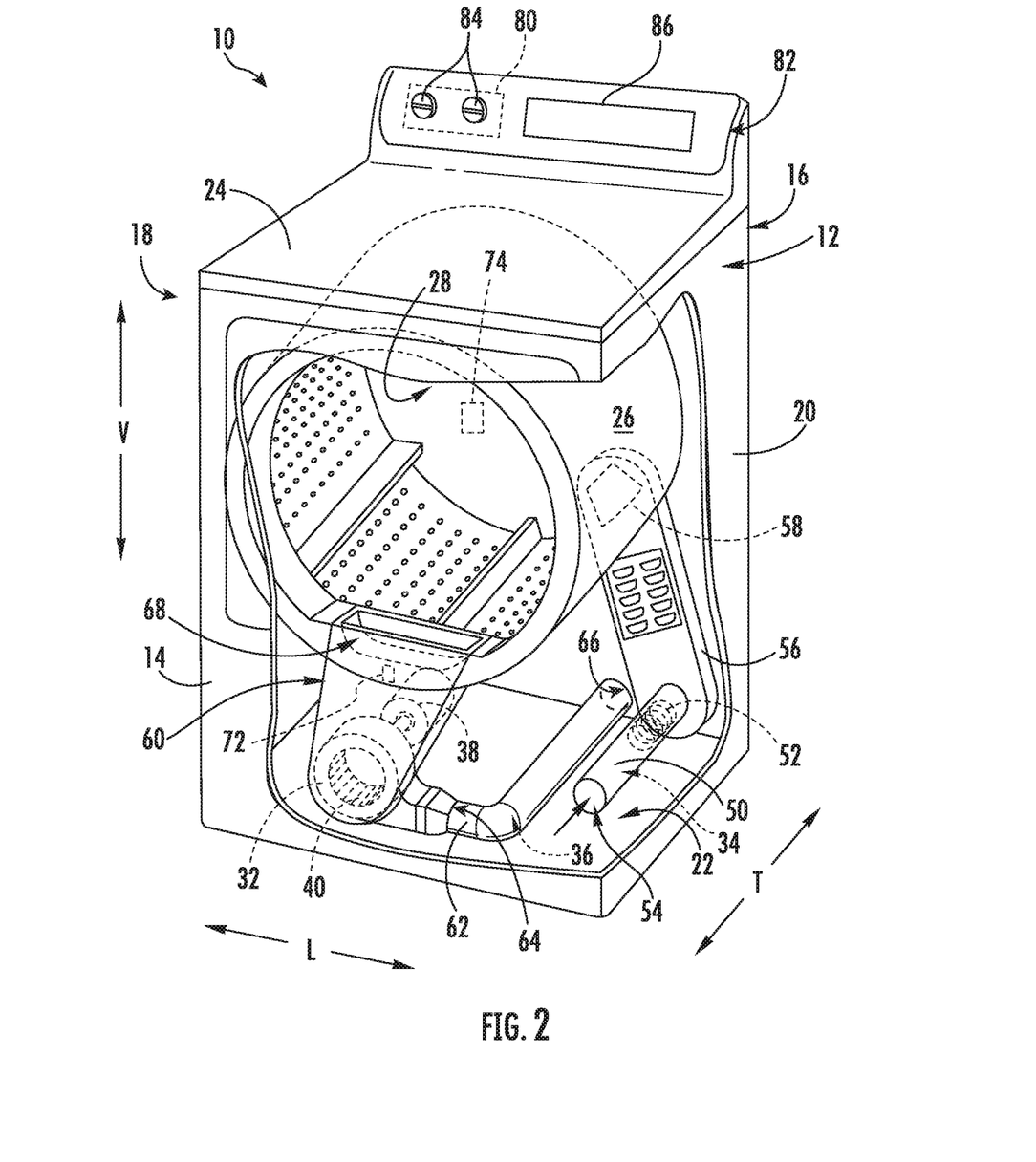
FIG. 2 provides a perspective view of the exemplary dryer appliance of FIG. 1 with portions of a cabinet of the exemplary dryer appliance removed to reveal certain components of the exemplary dryer appliance.

FIG. 1 illustrates a dryer appliance 10 according to an exemplary embodiment of the present subject matter. FIG. 2 provides another perspective view of dryer appliance 10 with a portion of a housing or cabinet 12 of dryer appliance 10 removed in order to show certain components of dryer appliance 10. While described in the context of a specific embodiment of a dryer appliance, using the teachings disclosed herein it will be understood that dryer appliance 10 is provided by way of example only. Other dryer appliances having different appearances and different features may also be utilized with the present subject matter as well.

Dryer appliance 10 defines a vertical direction V, a lateral direction L, and a transverse direction T. The vertical direction V, lateral direction L, and transverse direction T are mutually perpendicular and form an orthogonal direction system. Cabinet 12 includes a front panel 14, a rear panel 16, a pair of side panels 18 and 20 spaced apart from each other by front and rear panels 14 and 16, a bottom panel 22, and a top cover 24. Within cabinet 12 is a container or drum 26 which defines a chamber 28 for receipt of articles, e.g., clothing, linen, etc., for drying. Drum 26 extends between a front portion and a back portion, e.g., along the transverse direction T. In example embodiments, drum 26 is rotatable, e.g., about an axis that is parallel to the transverse direction T, within cabinet 12. A door 30 is rotatably mounted to cabinet 12 for providing selective access to drum 26.

An air handler 32, such as a blower or fan, may be provided to motivate an airflow (not shown) through an entrance air passage 34 and an air exhaust passage 36. Specifically, air handler 32 may include a motor 38 which may be in mechanical communication with a blower fan 40, such that motor 38 rotates blower fan 40. Air handler 32 is configured for drawing air through chamber 28 of drum 26, e.g., in order to dry articles located therein, as discussed in greater detail below. In alternative example embodiments, dryer appliance 10 may include an additional motor (not shown) for rotating fan 40 of air handler 32 independently of drum 26.

Drum 26 may be configured to receive heated air that has been heated by a heating assembly 50, e.g., in order to dry damp articles disposed within chamber 28 of drum 26. Heating assembly 50 includes a heater 52 that is in thermal communication with chamber 28. For instance, heater 52 may include one or more electrical resistance heating elements or gas burners, for heating air being flowed to chamber 28. As discussed above, during operation of dryer appliance 10, motor 38 rotates fan 40 of air handler 32 such that air handler 32 draws air through chamber 28 of drum 26. In particular, ambient air enters air entrance passage 36 defined by heating assembly 50 via an entrance 54 due to air handler 32 urging such ambient air into entrance 54. Such ambient air is heated within heating assembly 50 and exits heating assembly 50 as heated air. Air handler 32 draws such heated air through an air entrance passage 34, including an inlet duct 56, to drum 26. The heated air enters drum 26 through an outlet 58 of duct 56 positioned at a rear wall of drum 26.

Within chamber 28, the heated air can remove moisture, e.g., from damp articles disposed within chamber 28. This internal air flows in turn from chamber 28 through an outlet assembly positioned within cabinet 12. The outlet assembly generally defines an air exhaust passage 36 and includes a trap duct 60, air handler 32, and an exhaust conduit 62. Exhaust conduit 62 is in fluid communication with trap duct 60 via air handler 32. More specifically, exhaust conduit 62 extends between an exhaust inlet 64 and an exhaust outlet 66. According to the illustrated embodiment, exhaust inlet 64 is positioned downstream of and fluidly coupled to air handler 32, and exhaust outlet 66 is defined in rear panel 16 of cabinet 12. During a drying cycle, internal air flows from chamber 28 through trap duct 60 to air handler 32, e.g., as an outlet flow portion of airflow. As shown, air further flows through air handler 32 and to exhaust conduit 62.

The internal air is exhausted from dryer appliance 10 via exhaust conduit 62. In some embodiments, an external duct (not shown) is provided in fluid communication with exhaust conduit 62. For instance, the external duct may be attached (e.g., directly or indirectly attached) to cabinet 12 at rear panel 16. Any suitable connector (e.g., collar, clamp, etc.) may join the external duct to exhaust conduit 62. In residential environments, the external duct may be in fluid communication with an outdoor environment (e.g., outside of a home or building in which dryer appliance 10 is installed). During a drying cycle, internal air may thus flow from exhaust conduit 62 and through the external duct before being exhausted to the outdoor environment.

In exemplary embodiments, trap duct 60 may include a filter portion 68 which includes a screen lint filter 70 (FIG. 5) or other suitable device for removing lint and other particulates as internal air is drawn out of chamber 28. The internal air is drawn through filter portion 68 by air handler 32 before being passed through exhaust conduit 62. After the clothing articles have been dried (or a drying cycle is otherwise completed), the clothing articles are removed from drum 26, e.g., by accessing chamber 28 by opening door 30. The lint filter 70 may further be removable such that a user may collect and dispose of collected lint between drying cycles.

In some embodiments, dryer appliance 10 also includes one or more sensors that may be used to facilitate improved operation of dryer appliance 10, such as described below. For example, dryer appliance 10 may include one or more temperature sensors 72 which are generally operable to measure internal temperatures in dryer appliance 10 and/or one or more airflow sensors (not shown) which are generally operable to detect the velocity of air (e.g., as an air flow rate in meters per second, or as a volumetric velocity in cubic meters per second) as it flows through the appliance 10. In some embodiments, an appliance controller (e.g., controller 84 described below) is configured to vary operation of heating assembly 50 based on one or more temperatures detected by the temperature sensors 72 or air flow measurements from the airflow sensors.

Referring still to FIG. 2, dryer appliance 10 includes a humidity sensor 74 which is generally configured for measuring a chamber humidity. Humidity sensor 74 may be positioned at any suitable location within dryer appliance 10. As described herein, "humidity sensor" may refer to any suitable type of humidity sensor, such as capacitive digital sensors, resistive sensors, and thermal conductivity humidity sensors. In addition, humidity sensor 74 may be mounted at any suitable location and in any suitable manner for obtaining a desired humidity measurement, either directly or indirectly. Although exemplary positioning of certain sensors is described below, it should be appreciated that dryer appliance 10 may include any other suitable number, type, and position of temperature and/or humidity sensors according to alternative embodiments.

Referring again to FIGS. 1 and 2, dryer appliance 10 is further equipped with a controller 80 for regulating operation of dryer appliance 10. Controller 80 may include one or more memory devices and one or more microprocessors, such as general or special purpose microprocessors operable to execute programming instructions or micro-control code associated with an appliance operating cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 80 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Typically, dryer appliance 10 includes a cabinet backsplash 82 with a user panel/controls 84 mounted thereon. A user may manipulate user interface 84 to select various operational features/modes and monitor progress of dryer appliance 10. In one embodiment, user interface 84 may represent a general purpose I/O ("GPIO") device or functional block. In one embodiment, user interface 84 may include input components, such as one or more of a variety of electrical, mechanical or electro-mechanical input devices including rotary dials, push buttons, and touch pads. User interface 84 may include a display component 86, such as a digital or analog display device designed to provide operational feedback to a user. Display 86 may be in communication with controller 80, and may display information in response to signals from controller 80.

Controller 80 may be positioned in a variety of locations throughout dryer appliance 10. In the illustrated embodiment, controller 80 may be located within cabinet backsplash 82. In such an embodiment, input/output ("I/O") signals may be routed between the control system and various operational components of dryer appliance 10 along wiring harnesses that may be routed throughout dryer appliance 10. For example, user interface 84 and display 86 may be in communication with the controller 80 via one or more signal lines or shared communication busses.

Referring now generally to FIGS. 3 through 7, a lint cleaning assembly 100 that may be used with dryer appliance 10 will be described according to an exemplary embodiment of the present subject matter. In general, lint cleaning assembly 100 is configured for use with a robotic vacuum cleaner 102 to facilitate the automatic and periodic cleaning of a lint filter, such as lint filter 70. In general, robotic vacuum cleaner 102 may be any automated vacuum cleaner and/or mop device, such as Haier robotic vacuum cleaner, and iRobot Roomba, etc.

As understood by one skilled in the art, robotic vacuum cleaners typically clean floors of a residence by periodically leaving a charging dock and traveling throughout the residence while vacuuming up dirt and debris. Such vacuum cleaners typically utilize a variety of control algorithms, position and object detection sensors, and guidance systems to cover the desired area, while avoiding obstacles, and returning to a docking station for discharging collected dirt and/or charging internal batteries. Aspects of the present subject matter use a robotic vacuum cleaner to improve appliance performance by removing collected lint or dirt, while optionally providing a charging feature or serving as a docking station for the robotic vacuum cleaner.

Specifically, lint cleaning assembly 100 may include a vacuum aperture 110 that is defined in cabinet 12 of dryer appliance 10. In general, vacuum aperture 110 is configured for receiving robotic vacuum cleaner 102. Thus, according to the illustrated embodiment, vacuum aperture 110 is positioned at front 14 and bottom 22 of cabinet 12. In this manner, robotic vacuum cleaner 102 may drive directly into cabinet 12 through vacuum aperture 110 without requiring an external ramp or other receiving surface.

Figure 6:
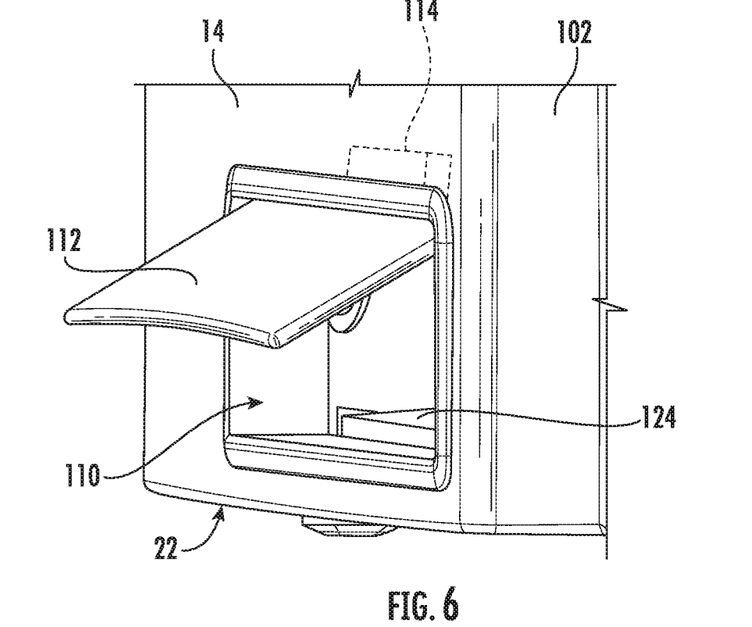
FIG. 6 provides a perspective view of a door positioned on the cabinet of the exemplary dryer appliance of FIG. 1.

As best shown in FIG. 6, lint cleaning assembly 100 may include a vacuum door 112 that is pivotally mounted to cabinet 12 over vacuum aperture 110. In this regard, vacuum door 112 is configured for swinging between an open position (e.g., as shown in FIG. 6) and a closed position (e.g., as shown in FIG. 1) to permit robotic vacuum cleaner 102 to enter and exit cabinet 12 while maintaining a substantially enclosed cabinet 12. According to the illustrated embodiment, dryer appliance 10 may further include an electric motor 114 that is operably coupled to vacuum door 112 to move vacuum door 112 between the open position in the closed position.

As used herein, "motor" may refer to any suitable drive motor and/or transmission assembly for moving vacuum door 112. For example, motor 114 may be a brushless DC electric motor, a stepper motor, or any other suitable type or configuration of motor. Alternatively, for example, motor 114 may be an AC motor, an induction motor, a permanent magnet synchronous motor, or any other suitable type of AC motor. In addition, motor 114 may include any suitable transmission assemblies, clutch mechanisms, or other components. Motor 114 and robotic vacuum cleaner 102 may be in operative communication with controller 80 such that controller 80 may be configured to open vacuum door 112 when robotic vacuum cleaner 102 approaches cabinet 12.

Lint cleaning assembly 100 further includes a vacuum docking station 120 that is positioned within cabinet 12 for receiving robotic vacuum cleaner 102. In addition, a lint collection duct 122 may provide fluid communication between trap duct 60 of dryer appliance 10 and vacuum docking station 120 to permit robotic vacuum cleaner 102 to remove lint from lint filter 70. Specifically, vacuum docking station 120 may include an inclined ramp 124 that at least partially defines a suction plenum 126 that is positioned below inclined ramp 124. In such an embodiment, lint collection duct 122 extends from trap duct 60 to suction plenum 126.

Notably, vacuum docking station 120 may be positioned just inside cabinet 12 adjacent vacuum aperture 110 such that a smooth transition between an exterior floor (not shown) and inclined ramp 124 may be achieved. In addition, inclined ramp 124 may define an inclination angle 130 relative to a bottom wall 132 of vacuum docking station 120 to define suction plenum 126 therebetween which is suitable for passing collected lint into robotic vacuum cleaner 102. For example, inclination angle 130 may be less than approximately 30 degrees, less than 15 degrees, or approximately 10 degrees. According to one exemplary embodiment, bottom wall 132 of suction plenum 126 is defined by bottom panel 22 of dryer appliance 10.

Figure 4:
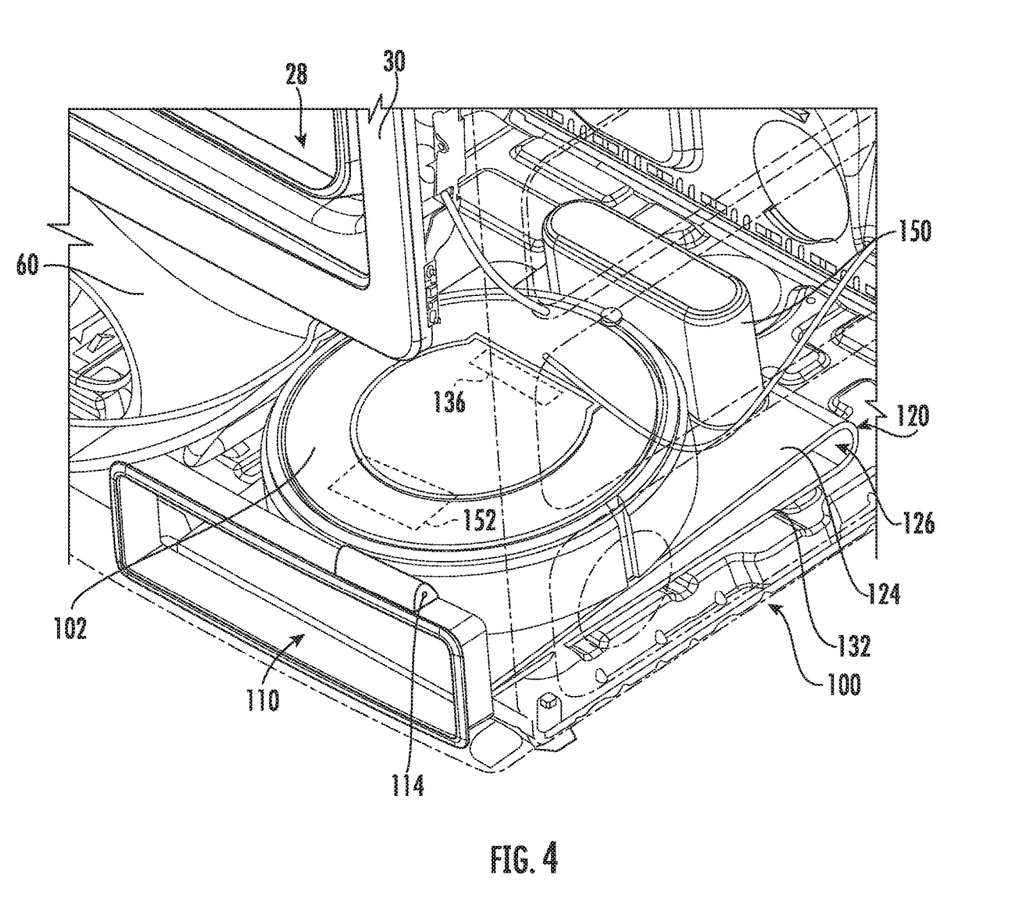
FIG. 4 provides a close-up perspective view of the exemplary lint cleaning assembly of FIG. 3.
Figure 5:
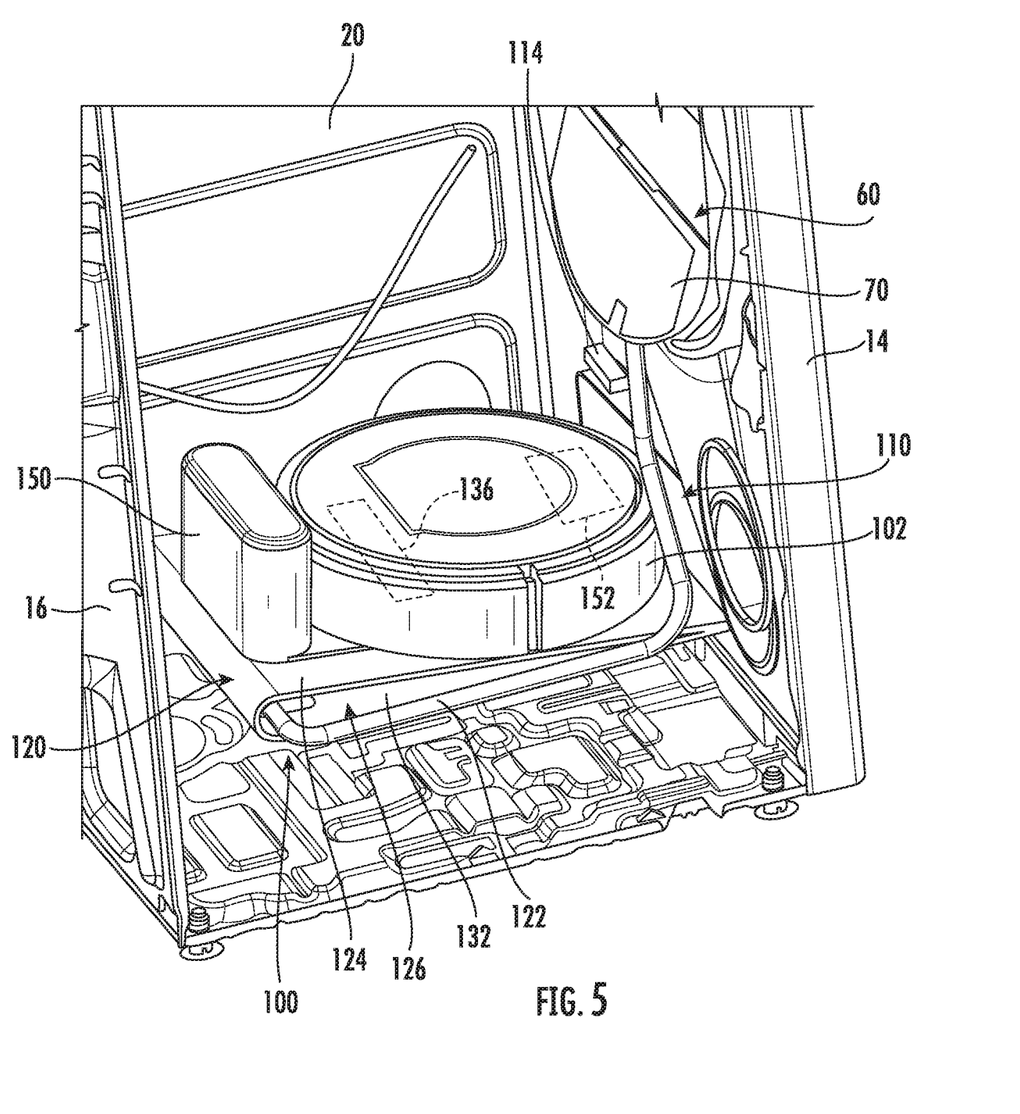
FIG. 5 provides a rear perspective view of the exemplary lint cleaning assembly of FIG. 3.
Figure 7:
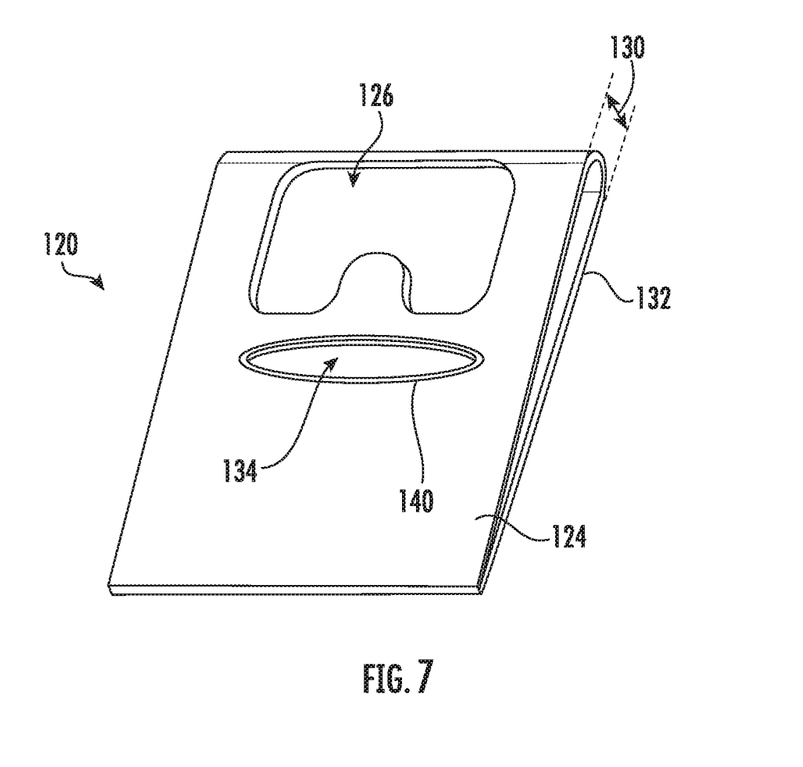
FIG. 7 illustrates a vacuum docking station for use with the exemplary lint cleaning assembly of FIG. 3 according to an exemplary embodiment of the present subject matter.

As best shown in FIGS. 4, 5, and 7, vacuum docking station 120 is generally configured for providing fluid communication between lint collection duct 122 (and suction plenum 126) and robotic vacuum cleaner 102 when robotic vacuum cleaner 102 is docked on inclined ramp 124. In this regard, inclined ramp 124 may define a suction aperture 134 that fluidly couples suction plenum 126 to robotic vacuum cleaner 102. Specifically, robotic vacuum cleaner 102 may define a suction port 136 (e.g., as shown in FIGS. 4 and 5) for vacuuming dirt, debris, and collected lint into an internal collection bin (not shown). In this manner, suction generated by robotic vacuum cleaner 102 may draw all collected lint off of lint filter 70, down through lint collection duct 122, through suction plenum 126, through suction aperture 134, and into robotic vacuum cleaner 102 via suction port 136.

As illustrated in FIG. 7, according to an exemplary embodiment, inclined ramp 124 may further include a resilient gasket 140 that surrounds suction aperture 134 to provide a substantially airtight seal with suction port 136 of robotic vacuum cleaner 102 when the robotic vacuum cleaner 102 is docked on inclined ramp 124. For example, resilient gasket 140 may be a rubber O-ring or other flexible member that surrounds suction port 136 and contacts robotic vacuum cleaner 102 when docked. It should be appreciated that as used herein, terms of approximation, such as "approximately," "substantially," or "about," refer to being within a ten percent margin of error.

Referring now specifically to FIG. 5, lint collection duct 122 will be described in more detail according to an exemplary embodiment. As illustrated, lint collection duct 122 is a small pipe that extends from suction plenum 126 up to trap duct 60. Specifically, lint collection duct 122 opens into trap duct 60 upstream of lint filter 70 and at a bottom of trap duct 60. However, it should be appreciated that lint collection duct 122 could alternatively be a wide duct that wraps around a backside of vacuum docking station 120 or has any other size or configuration suitable for providing fluid communication between trap duct 60 and suction plenum 126.

In addition, lint cleaning assembly 100 is illustrated herein as being configured for use with a dryer appliance 10 having a conventional lint filter configuration (e.g., with lint filter 70 being positioned just downstream of chamber 28). However, according to alternative embodiments, trap duct 60 or another exhaust conduit could extend from chamber 28 all the way down to suction plenum 126 before being coupled to exhaust conduit 62. In such an embodiment, lint filter 70 could be positioned directly in suction plenum 126. Thus, when robotic vacuum cleaner 102 docks on vacuum docking station 120, suction port 136 of robotic vacuum cleaner 102 may be positioned directly over lint filter 70 for efficient evacuation of collected lint. Other lint filter configurations are possible and within the scope of the present subject matter.

Figure 3:
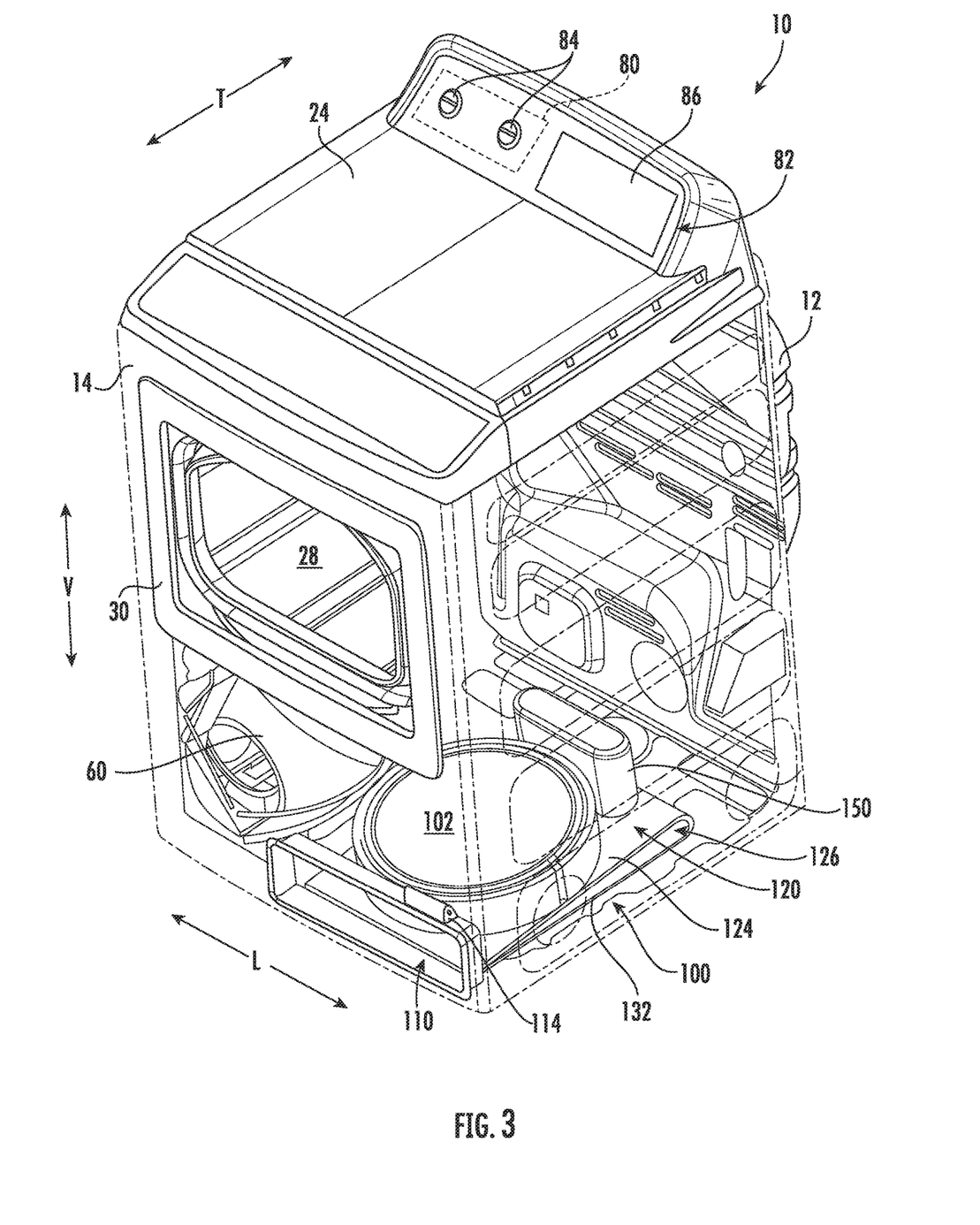
FIG. 3 depicts a perspective view of the exemplary dryer appliance of FIG. 1, with a portion of the cabinet illustrated in phantom to show a lint cleaning assembly according to an exemplary embodiment of the present subject matter.

As best shown in FIGS. 3 through 5, lint cleaning assembly 100, or more specifically vacuum docking station 120, may further include a power supply 150 for charging robotic vacuum cleaner 102. In this manner, when robotic vacuum cleaner 102 returns to dryer appliance 10, e.g., to remove collected lint, it may simultaneously charge internal batteries 152 of robotic vacuum cleaner 102. Power supply 150 may be operably coupled with internal batteries 152 in any suitable manner. For example according to one embodiment, electrical contacts (not shown) on power supply 150 may engage robotic vacuum cleaner 102 when docked on inclined ramp 124.

According to an alternative embodiment, power supply 150 may charge internal batteries 152 of robotic vacuum cleaner 102 by inductive charging. Specifically, "inductive charging" refers to charging facilitated by the transfer of energy through electromagnetic induction. In this regard, and inductive coil (not shown) within power supply 150 transfers energy to internal batteries 152 using an electromagnetic field.

Lint cleaning assembly 100 is described below according to an exemplary embodiment of the present subject matter. However, it should be appreciated that the exemplary functions and configurations of lint cleaning assembly 100 provided herein are used only as examples to facilitate description of aspects of the present subject matter. System configurations may vary, other robotic vacuum cleaners may be used to clean portions of other appliances, other system configurations may be implemented, etc. These variations, modifications, and other applications are contemplated as within the scope of the present subject matter.

For example, although lint cleaning assembly 100 is described herein is working with robotic vacuum cleaner 102 to clean lint from a lint filter of a dryer appliance, it should be appreciated that aspects of the present subject matter may be used to clean lint or other debris from other locations within any suitable appliance. In this regard, for example, a refrigerator appliance may be configured for using a lint cleaning assembly similar to lint cleaning assembly 100 to remove dust, dirt, and debris from the evaporator coils. Alternatively, robotic vacuum cleaner 102 could include a mop system that includes a mop reservoir. In such an embodiment, the robotic vacuum cleaner 102 could dock in a dishwasher appliance, which could both evacuate soiled wash water and replenish the mop reservoir with fresh mopping fluid.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A dryer appliance defining a vertical, a lateral, and a transverse direction, the dryer appliance comprising:
    a cabinet defining a vacuum aperture configured for receiving a robotic vacuum cleaner;
    a drum rotatably mounted within the cabinet, the drum defining a chamber for receipt of clothes for drying;
    an air handler for urging a flow of air through the chamber;
    a trap duct in fluid communication with the chamber and comprising a lint filter for filtering lint from the flow of air exiting the chamber;
    a vacuum docking station positioned within the cabinet for receiving the robotic vacuum cleaner; and
    a lint collection duct providing fluid communication between the trap duct and the vacuum docking station to permit the robotic vacuum cleaner to remove lint from the lint filter.

2. The dryer appliance of claim 1, wherein the vacuum docking station comprises:
    a power supply for charging the robotic vacuum cleaner.

3. The dryer appliance of claim 2, wherein the power supply charges a battery of the robotic vacuum cleaner by inductive charging.

4. The dryer appliance of claim 1, wherein the vacuum docking station comprises:
    an inclined ramp at least partially defining a suction plenum below the inclined ramp, wherein the lint collection duct is fluidly coupled to the suction plenum.

5. The dryer appliance of claim 4, wherein the inclined ramp defines a suction aperture fluidly coupling a suction port of the robotic vacuum cleaner to the suction plenum.

6. The dryer appliance of claim 5, further comprising:
    a resilient gasket surrounding the suction aperture to provide a substantially airtight seal with the suction port of the robotic vacuum cleaner when the robotic vacuum cleaner is docked on the inclined ramp.

7. The dryer appliance of claim 1, further comprising:
    a vacuum door pivotally mounted to the cabinet over the vacuum aperture.

8. The dryer appliance of claim 1, further comprising:
    an electric motor for moving the vacuum door between an open position and a closed position.

9. The dryer appliance of claim 1, wherein the vacuum aperture is positioned at a front and a bottom of the cabinet.

10. The dryer appliance of claim 1, wherein the trap duct is positioned under the vacuum docking station of the robotic vacuum cleaner.

11. A lint cleaning assembly for a dryer appliance, the dryer appliance comprising a cabinet defining a vacuum aperture for receiving a robotic vacuum cleaner and a drum defining a chamber for receiving clothes for drying, the lint cleaning assembly comprising:
   a trap duct in fluid communication with the chamber and comprising a lint filter for filtering lint from a flow of air exiting the chamber;
   a vacuum docking station positioned within the cabinet for receiving the robotic vacuum cleaner; and
   a lint collection duct providing fluid communication between the trap duct and the vacuum docking station to permit the robotic vacuum cleaner to remove lint from the lint filter.

12. The lint cleaning assembly of claim 11, wherein the vacuum docking station comprises:
   a power supply for charging the robotic vacuum cleaner.

13. The lint cleaning assembly of claim 12, wherein the power supply charges a battery of the robotic vacuum cleaner by inductive charging.

14. The lint cleaning assembly of claim 11, wherein the vacuum docking station comprises:
   an inclined ramp at least partially defining a suction plenum below the inclined ramp, wherein the lint collection duct is fluidly coupled to the suction plenum.

15. The lint cleaning assembly of claim 14, wherein the inclined ramp defines a suction aperture fluidly coupling a suction port of the robotic vacuum cleaner to the suction plenum.

16. The lint cleaning assembly of claim 15, further comprising:
   a resilient gasket surrounding the suction aperture to provide a substantially airtight seal with the suction port of the robotic vacuum cleaner when the robotic vacuum cleaner is docked on the inclined ramp.

17. The lint cleaning assembly of claim 11, further comprising:
   a vacuum door pivotally mounted to the cabinet over the vacuum aperture.

18. The lint cleaning assembly of claim 17, further comprising:
   an electric motor for moving the vacuum door between an open position and a closed position.

19. The lint cleaning assembly of claim 11, wherein the vacuum aperture is positioned at a front and a bottom of the cabinet.

20. The lint cleaning assembly of claim 11, wherein the trap duct is positioned under the vacuum docking station of the robotic vacuum cleaner.

* * * * *